United States Patent
Zhang et al.

(10) Patent No.: US 9,072,048 B2
(45) Date of Patent: Jun. 30, 2015

(54) POWER CONTROL DEVICE FOR MOBILE COMMUNICATION AND METHOD THEREOF

(75) Inventors: Zheng Zhang, San Diego, CA (US);
Anna Gontar, Encinitas, CA (US)

(73) Assignee: VIA TELECOM CO., LTD., George Town, Grand Cayman (KY)

( * ) Notice: Subject to any disclaimer, the term of this patent is extended or adjusted under 35 U.S.C. 154(b) by 168 days.

(21) Appl. No.: 13/564,277

(22) Filed: Aug. 1, 2012

(65) Prior Publication Data

US 2013/0034034 A1    Feb. 7, 2013

Related U.S. Application Data

(60) Provisional application No. 61/513,936, filed on Aug. 1, 2011.

(51) Int. Cl.
*G08C 17/00* (2006.01)
*H04W 52/02* (2009.01)
*H04W 68/02* (2009.01)

(52) U.S. Cl.
CPC .......... *H04W 52/0216* (2013.01); *H04W 68/02* (2013.01)

(58) Field of Classification Search
CPC .................. H04L 29/12047; H04L 41/0659; H04W 92/12
USPC ........................................... 370/311
See application file for complete search history.

(56) References Cited

U.S. PATENT DOCUMENTS

| | | | |
|---|---|---|---|
| 2009/0180451 A1 | 7/2009 | Alpert et al. | |
| 2009/0245152 A1* | 10/2009 | Hsu et al. | 370/311 |
| 2010/0260159 A1* | 10/2010 | Zhang et al. | 370/338 |
| 2010/0284379 A1* | 11/2010 | Bitran et al. | 370/338 |
| 2011/0243002 A1* | 10/2011 | Tsuruoka | 370/252 |
| 2012/0120858 A1* | 5/2012 | Das et al. | 370/311 |
| 2012/0122511 A1* | 5/2012 | Antonio et al. | 455/522 |

* cited by examiner

*Primary Examiner* — Andrew Lai
*Assistant Examiner* — Jamaal Henson
(74) *Attorney, Agent, or Firm* — McClure, Qualey & Rodack, LLP

(57) ABSTRACT

A power control method and device for mobile communication are disclosed. The power control method, performed by a mobile communication device including a controller, a radio frequency (RF) circuit and a baseband circuit, includes receiving, by the RF circuit, a first signal; determining, by the controller, when a second signal is come; turning off, by the controller, the RF circuit when the first signal is received and the second signal has not yet arrived; and processing, by the baseband circuit, the received first signal.

18 Claims, 4 Drawing Sheets

POWER CONTROL DEVICE FOR MOBILE COMMUNICATION AND METHOD THEREOF

CROSS REFERENCE TO RELATED APPLICATIONS

This Application claims priority of U.S. Provisional Application No. 61/513,936, filed on 1 Aug. 2011, and the entirety of which is incorporated by reference herein.

BACKGROUND OF THE INVENTION

1. Field of the Invention

The invention relates to a communication system, and more particularly to a power control device for mobile communication and the method thereof.

2. Description of the Related Art

Mobile communication devices such as smart phones and tablet PCs require power management for reducing unwanted power usage and prolonging battery life. Mobile devices especially those 3rd-generation (3G) mobile devices need more and more power for the bigger and bigger screen and more and more applications. Also, the power control techniques for 2G mobile devices are not appropriate for 3G mobile device.

Therefore, there needs a new method for power controlling 3G mobile communication.

BRIEF SUMMARY OF THE INVENTION

A power control method is provided, performed by a mobile communication device comprising a controller, a radio frequency (RF) circuit and a baseband circuit, includes receiving, by the RF circuit, a first signal; determining, by the controller, when a second signal is come; turning off, by the controller, the RF circuit when the first signal is received and the second signal has not yet arrived; and processing, by the baseband circuit, the first signal.

A power control device for mobile communication is disclosed, comprising an RF circuit, a controller, and a baseband circuit. The RF circuit is configured to receive a first signal. The controller, coupled to the RF circuit, is configured to determine when a second signal is come and turn off the RF circuit when the first signal is received and the second signal has not yet arrived. The baseband circuit, coupled to the RF circuit and the controller, is configured to processing the first signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
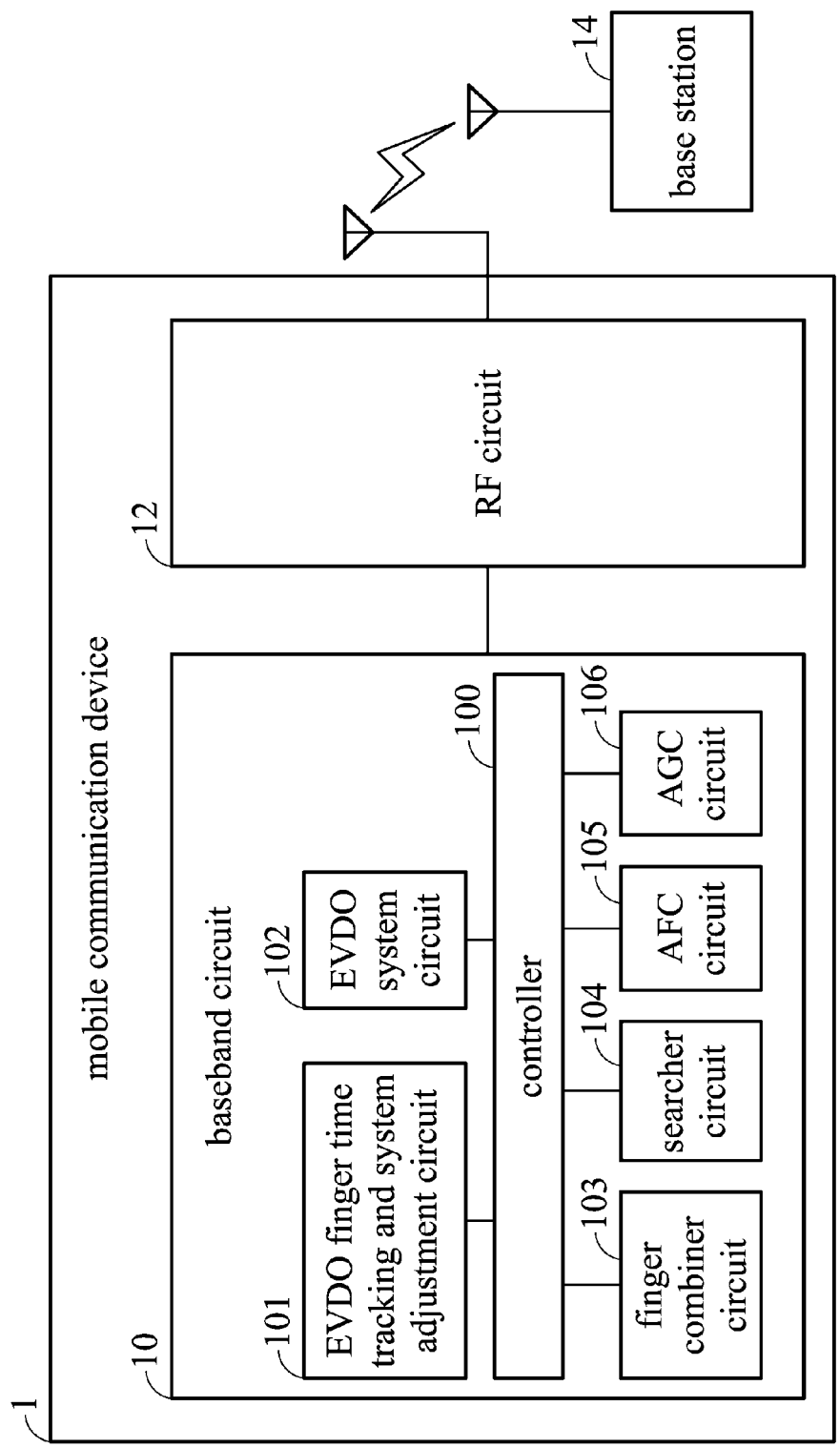
FIG. 1 is a block diagram of a mobile communication device according to an embodiment of the invention.

It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a block diagram of a mobile communication device 1 according to an embodiment of the invention. The mobile communication device 1 may be a 3G mobile device. The mobile communication device 1 in this embodiment may be a smart phone or a tablet computer compliant with a Code Division Multiple Access (CDMA) technology such as an Evolution-Data Optimized (EVDO) standard. The EVDO revision 3 standard uses a time-division multiplexed downlink, with each time slot containing the pilot and MAC channels and a data portion that may contain the traffic or control channel. The mobile communication device 1 can acquire the EVDO network in an initialization state by an initialization state protocol, and then enter an idle state before a connection is open. In the initialization state, the mobile communication device 1 can choose the EVDO network on which to operate, acquire a forward pilot channel, and synchronize to a system time of the selected EVDO network. In the idle state, the mobile communication device 1 can communicate with the EVDO network by a Default Idle State protocol (IDP) and a Control Channel MAC (CCM) protocol, where the IDP provides procedures for updating parameters received from an Overhead Message protocol and tracking a current location of the mobile communication device 1, the CCM protocol contains procedures for access network transmission and packet scheduling on a control channel, acquisition of the control channel, and control channel MAC layer packet reception.

The mobile communication device 1 can determine whether another signal that may be considered as a second signal is coming according to a received control channel MAC layer packet that may be considered as a first signal. Conventionally, when a LastPacket bit in a control channel header of the control channel MAC layer packet is set to 0, an EVDO mobile communication device can continue monitoring the control channel for the next control channel MAC layer packet. Further, the conventional EVDO mobile communication device can expect no more incoming control channel MAC layer packets when (1) no further control channel MAC layer packet is received within the designated time; (2) a deactivate command is received; or (3) the LastPacket bit in the received control channel MAC layer packet is set to 1. Therefore, the conventional EVDO mobile communication device cannot turn off the power thereof and go to sleep in anticipation of an incoming control channel MAC layer packet.

The control channel MAC layer packet can be encapsulated in one of three types of data capsules transmitted in the control channel, namely a synchronous capsule (SC), a sub-synchronous capsule (ASC), and an asynchronous capsule (AC). The synchronous capsules are transmitted once at a first predetermined time slot in every 256 slots, containing more than one control channel MAC layer packet. The sub-synchronous capsules are transmitted once at a second predetermined time slot in every 64 slots, including exactly one control channel MAC layer packet. The asynchronous capsules, comprising more than one control channel MAC layer packet, are transmitted whenever needed, but never overlapping with the synchronous or sub-synchronous capsules. Each control channel cycle includes 256 time slots. The SC, SSC, and AC are transmitted at 38.4 kpbs or 76.8 kbps using a 1024-bit payload. The synchronous capsules may be a Control Channel synchronous Sleep State capsule indicated by a SleepStateCapsuleDone bit in the control channel header set as 0. When the Control Channel Synchronous Sleep State capsules are completely transmitted, the SleepStateCapsuleDone bit is 1.

In the present embodiment, the mobile communication device 1 can turn off an RF circuit 12 and unused components of baseband circuit 10 when an incoming control channel MAC layer packet is anticipated, and turn the RF circuit 12 and unused components of baseband circuit 10 back on before the arrival of the incoming control channel MAC layer packet. The mobile communication device 1 can contain the RF circuit 12 and a baseband circuit 10 which includes a controller 100, an EVDO finger time tracking and system time adjustment circuit 101, an EVDO system circuit 102, a finger combiner circuit 103, a searcher circuit 104, an automatic frequency control (AFC) circuit 105, and an automatic gain control (AGC) circuit 106.

In some implementations, in the idle state, when the mobile communication device 1 receives the SleepStateCapsuleDone bit of the control channel MAC layer packet as 0, it can determine more than one Control Channel Synchronous Sleep State capsule is yet to come. The mobile communication device 1 can shut off the RF circuit 12 and unused components of baseband circuit 10 including the EVDO finger time tracking and system time adjustment circuit 101, the searcher circuit 104, the AGC circuit 106, AFC circuit 105, while keeping some components of the baseband circuit including the controller 100, the finger combiner circuit 103 and EVDO system circuit 102 in operation. The mobile communication device 1 can define a RMC_IDLE_PAUSED mode to put the EVDO finger time tracking and system time adjustment circuit 101, the searcher circuit 104, the AGC circuit 106, AFC circuit 105 to sleep. The finger combiner circuit 103 can continue to run to reduce the finger and later decoding unused components' setup time for coming packet, when the RF circuit 12 and unused components of baseband circuit 10 are suspended. Accordingly, the synchronous capsule is transmitted exactly once at the first predetermined time slot of the control channel cycle, thus the mobile communication device 1 can determine a time at which the next Control Channel Synchronous Sleep State capsule will arrive. The mobile communication device 1 can turn the RF circuit 12 and the suspended components of baseband circuit 10 on before the next Control Channel Synchronous Sleep State capsule comes up. For example, for a data rate of 76.8 kbps, the mobile communication device 1 can turn on the RF circuit 12 and the suspended components of baseband circuit 10 at around 52 ms after the previous synchronous capsule started. In some embodiments, the mobile communication device 1 can wake up the AFC circuit 105 at a predetermined time interval before the next Control Channel Synchronous Sleep State capsule arrives for a fast AFC update, defined by an AFC_TRACK_FAST_MODE.

Figure 2:
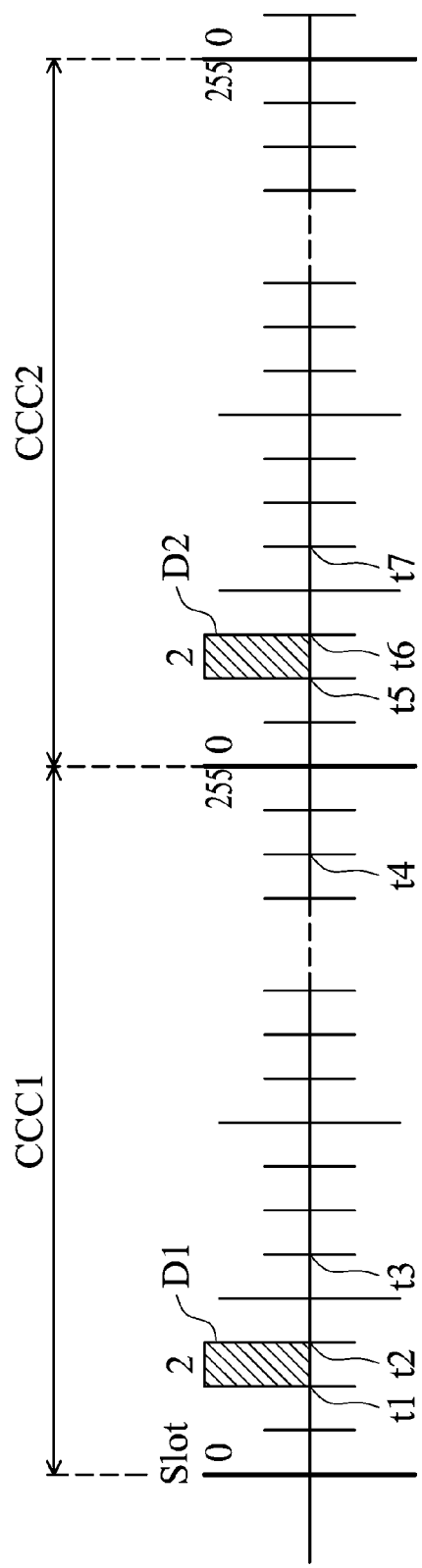
FIG. 2 is a timing diagram for signals on the control channel in the idle state in the EVDO network according to an embodiment of the invention.

FIG. 2 illustrates a timing diagram for signals on the control channel in the idle state of the EVDO network according to an embodiment of the invention. At the time interval between times t1 and t2 in the first control channel cycle CCC1, a signal D1 can be received by the mobile communication device 1. In the embodiment, the signal D1 may be a downlink signal, but the invention doesn't limit thereof. The signal D1 may be a Control Channel Synchronous Sleep State capsule with the SleepStateCapsuleDone bit being 0 and the LastPacket bit being 0. The mobile communication device 1 can determine a next signal, in the embodiment that is the next Control Channel Synchronous Sleep State capsule is coming in the next control channel cycle CCC2 and turn off the RF circuit 12 and unused components 101, 104, 105, and 106 in baseband circuit 10 at time t3. In some embodiments, the mobile communication device 1 can stop retrieving the Control Channel Synchronous Sleep State capsule before time t2, when the retrieved Control Channel Synchronous Sleep State capsule is decodable, validating an error detection scheme such as a cyclic redundancy check (CRC). The mobile communication device 1 can keep the finger combiner circuit 103 and EVDO system circuit 102 in operation in the time interval between times t3 and t4 and resume operations of the RF circuits and the shut-off baseband circuits 101, 104, 105, and 106 at time t4. Time t4 is a time before the next Control Channel Synchronous Sleep State capsule being transmitted in the air and the exact time for time t4 may be dependent on the signal quality condition of the transmission environment. For example, the mobile communication device 1 can wake up the RF circuits and the baseband circuits 101, 104, 105, and 106 at an earlier time t4 when the signal quality condition is harsh, for example, when the detected signal quality is less than a predetermined signal quality threshold, providing an increased length of time for initiating the suspended RF circuit 12 and the suspended components 101, 104, 105, and 106 of baseband circuit 10 before retrieving the next signal. Conversely, when the detected signal quality exceeds or equals the predetermined signal quality threshold, the mobile communication device 1 can wake up the RF circuit 12 and the components 101, 104, 105, and 106 of baseband circuit 10 at a later time t4. The AFC circuit 105 and AGC circuit 106 are switched on, allowing the time for the AFC update prior to the signal pickup. At the interval between time t4 and t5, the mobile communication device 1 is ready to receive the next signal D2, which may contain the SleepStateCapsuleDone bit as 1 and the LastPacket bit as 1, indicating that the received signal D2 is the last signal of the Control Channel Synchronous Sleep State capsules. In response, the mobile communication device 1 can enter a sleep state at time t7.

The mobile communication device 1 can switch off the unused RF circuit and unused components of baseband circuit while keeping certain components of baseband circuit in operation at the time interval from the time the previous signal was last received to the time the next signal arrives, and restore the suspended RF circuit and components of baseband circuit before the next signal comes in, reducing power consumption for the mobile communication device 1 without degrading device performance in receiving the incoming signals.

In other implementations, in the initialization state, the mobile communication device 1 can search for a pilot signal. The EVDO finger time tracking and system time adjustment circuit 101 and the finger combiner circuit 103 are not used in this state, so they are turned off in the initialization state. After capturing enough signal, in the embodiment, it may be after capturing enough pilot signal, the mobile communication device 1 can leave the controller 100, the search circuit 104 and the EVDO system circuit 102 on and turn the RF circuit 12 and the components 105 and 106 of baseband circuit off. The mobile communication device 1 can define a RMC_INITACQ_PAUSED mode to put the AGC circuit 106, and the AFC circuit 105 to sleep. The search circuit 104 and EVDO system circuit 102 can continue to process the received pilot signal to determine whether pilot is acquired.

Upon completion of the data processing in the search circuit 104 and the EVDO system circuit 102, the mobile communication device 1 can turn on the RF circuit 12 and the components 105 and 106 of baseband circuit to carry on the further pilot signal search. Persons having ordinary skill in the art should recognize that the mobile communication device 1 may be modified to accommodate for 2G, 3G, and other communication standards to pause the unused RF and components of baseband circuit in the pilot scan state according to the principles disclosed in the embodiment.

Figure 3:
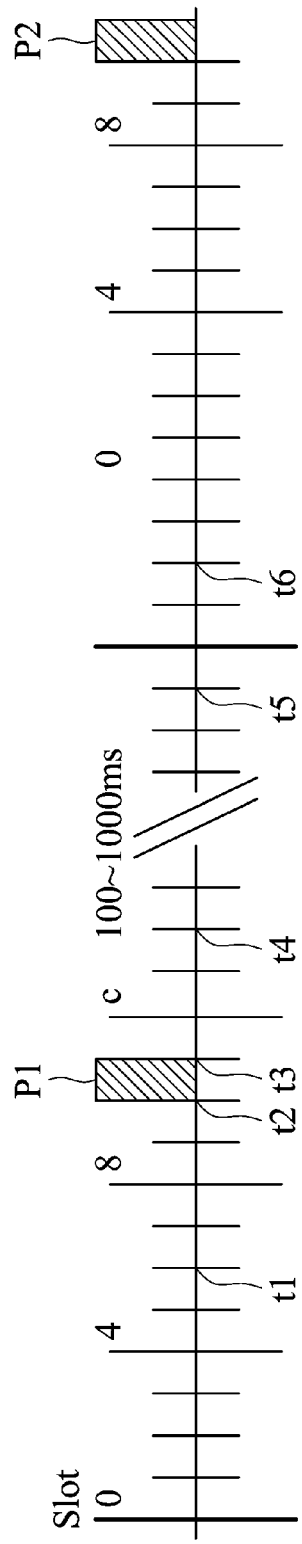
FIG. 3 illustrates a timing diagram for pilot signal acquisition in the initialization state in the EVDO network according to an embodiment of the invention.

FIG. 3 illustrates a timing diagram for pilot signal acquisition in the initialization state in the EVDO network according to an embodiment of the invention. At time t1, the mobile communication device 1 can turn on the RF circuit 12 and the baseband circuit 10, except 101 and 103, to scan for a signal P1 over one or more slots. The signal P1 in the embodiment may be a pilot signal. The AFC circuit 105 and AGC circuit 106 are settled into stable states before the pilot signal P1 is present in the air interface. At the time interval between times t2 and t4, pilot signal P1 can be captured by the mobile communication device 1. The pilot signal P1 may be pilot for timing synchronization to the EVDO network. At time t4, the pilot signal P1 is captured, so the mobile communication device 1 can turn off the RF circuit 12 and unused components 105 and 106 of baseband circuit, and keep the search circuit 104 and the EVDO system circuit 102 in operation. At time t5, the signal processing in the search circuit 104 and the EVDO system circuit 102 are completed, and the mobile communication device 1 can restore suspended the RF circuit 12 and the unused components 105 and 106 of baseband circuit 10 at time t5, getting ready for further pilot signal P2 search.

The mobile communication device 1 can switch off the RF circuit and unused components of baseband circuit while keeping certain components of baseband circuit in operation to determine whether a pilot is detected, and restore the suspended RF circuits and baseband circuits when the pilot determination process is completed, reducing power consumption for the mobile communication device 1 without degrading device performance.

Referring to FIG. 1, the baseband circuit 10 includes various digital circuits to perform baseband signal processing. For example, in order to realize CDMA communication, the EVDO finger time tracking and system time adjustment circuit 101 is utilized to track RF receiving path delay changes and control the system time change rate when system time follows finger time tracking. The EVDO system circuit 102 provides various system time signals. The searcher circuit 104 is utilized to recognize a plurality of signal paths, e.g. by correlators, and the finger combiner circuit 103 is utilized to combine data from the different signal paths, e.g. by correlators, to provide combined data for digital signal processing. The AFC circuit 105 is configured to provide initial frequency acquisition and Doppler frequency adjustment of the received signals which have been distributed by multipath. The AGC circuit 106 is configured to manage a receiver gain control for the RF circuit 12.

The RF circuit 12 may comprise hardware to perform analog-to-digital conversion (ADC), digital-to-analog conversion (DAC), gain adjustment, modulation, demodulation, and signal filtering processes. The RF circuit 12 may receive RF signals from a base station 14 and down-convert the received RF signals to baseband signals to be processed by the baseband circuit 10, or receive baseband signals from the baseband circuit 10 and up-convert the received baseband signals to RF signals for uplink transmission. The RF circuit 12 may comprise a mixer to up-convert the baseband signals with a component carrier signal oscillated at a radio frequency of the wireless communications system.

The mobile communication device 1 can switch off the unused RF circuit 12 and the unused components of baseband circuit 10 while keeping some components of baseband circuit 10 in operation to perform baseband signal processing when no more data packet or signal are needed from the air interface, and restore the suspended RF circuits and the unused components of baseband circuit before the next signal arrives, reducing power consumption for the mobile communication device 1 without degrading device performance.

Figure 4:
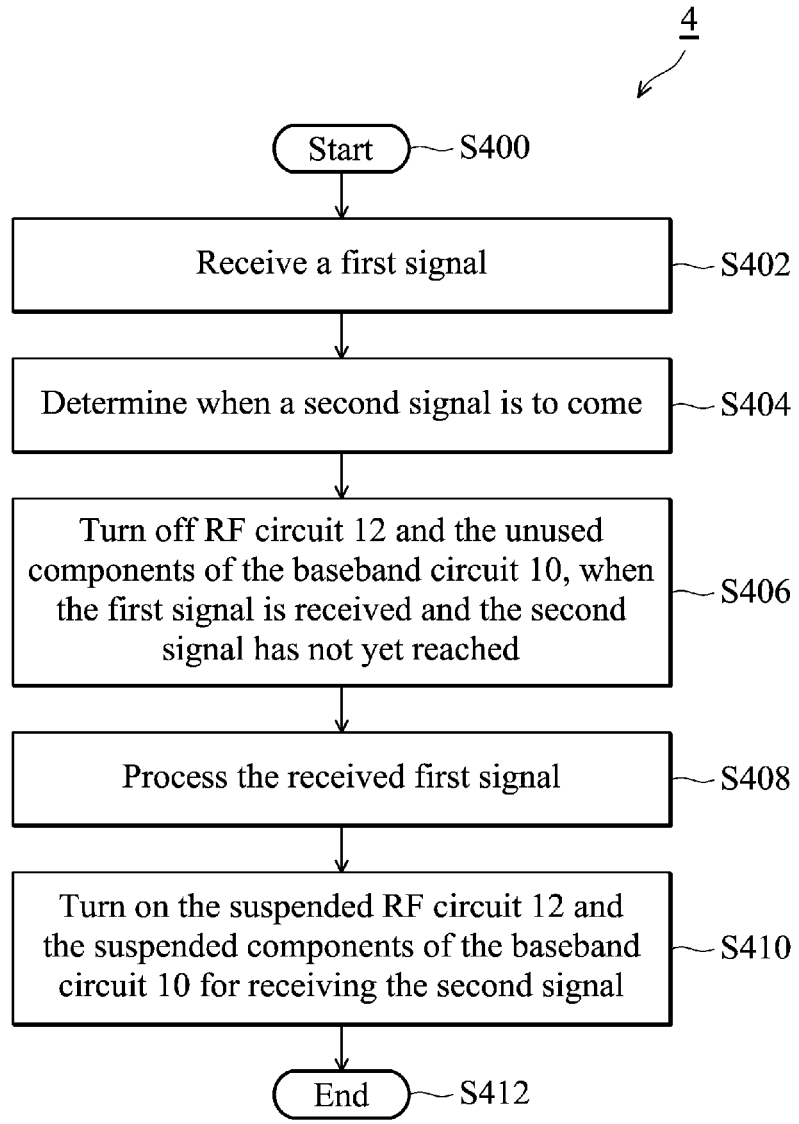
FIG. 4 is a flowchart of a power control method according to an embodiment of the invention.

FIG. 4 is a flowchart of a power control method 4 according to an embodiment of the invention, incorporating the mobile communication device 1 in FIG. 1.

Upon startup, the mobile communication device 1 is initialized for receiving a downlink signal (S400). The downlink signal may be a control channel MAC layer packet or a pilot signal. After retrieving the downlink signal, which is considered as a first signal or a first pilot signal, from the air interface (S402), the mobile communication device 1 can determine that a further downlink signal, which is considered as a second signal or a second pilot signal, is upcoming, either by the SleepStateCapsuleDone bit and the LastPacket bit in the control channel MAC layer packet, or the EVDO specification (S404). The controller 100 of the mobile communication device 1 can turn off the RF circuit 12 and unused components of baseband circuit 10 when a part of the signal is received and the next signal has not yet arrived (S406). Upon determining the received downlink signal is decodable, the mobile communication device 1 can turn off the unused components of baseband circuit 10 and RF circuit 12 and leave some components of baseband circuit to continue processing the received signal. The suspended RF circuit and components of baseband circuit can be woken up to resume normal operation when the baseband signal processing is complete or just before the next downlink signal arrives (S408). In the monitor mode of the idle state, the mobile communication device 1 can turn off the baseband circuits including the EVDO finger time tracking and system time adjustment circuit 101, the searcher circuit 104, the AGC circuit 106, and the AFC circuit 105, while keeping some components of baseband circuit including the finger combiner circuit 103 and EVDO system circuit 102 in operation. The mobile communication device 1 can determine when the next synchronous signal is arrive, continue processing the received signal by the finger combiner circuit 103 when the other circuits are suspended, and restore the suspended circuits back into operation before the next signal arrives. The mobile communication device 1 can wake up the suspended circuits at a predetermined time interval before the next signal arrives, allowing the suspended circuits sufficient time for circuit initialization. In the scan mode of the initialization state, the mobile communication device 1 can turn off the AGC circuit 106, and the AFC circuit 105, while keeping the search circuit 104 and the EVDO system circuit 102 in operation. The EVDO finger time tracking and system time adjustment circuit 101 and the finger combiner circuit 103 are not used in this scan mode, so they are turned off. The mobile communication device 1 can continue processing the received signal by the searcher circuit 104 and the EVDO system circuit 102 to retrieve the pilot when other circuits are suspended. After the searcher circuit 104 and the EVDO system circuit 102 completes signal processing to the received signal, the processed result may be passed to software or hardware for evaluating whether a pilot has been detected. When a pilot is not found, the mobile communication device 1 can then restore the suspended RF circuit and suspended components of baseband circuit upon completing the evaluation, searching for the next pilot. When a pilot is found, the mobile communication device 1 can then restore the suspended RF circuit and suspended components of baseband circuit for further processing. The power control method 4 is then completed and exited (S410).

The power control method 4 can switch off the unused RF circuit and unused components of baseband circuit while keeping some components of baseband circuit in operation to perform baseband signal processing when no more downlink signal is needed over the air interface, and restore the suspended RF circuits and baseband circuits before the next needed downlink signal arrives, reducing power consumption for the mobile communication device 1 without degrading device performance.

The present invention of power control method for mobile communication may be performed by a power control device for mobile communication that is not shown in FIG. 1. The power control device for mobile communication may be set in the mobile communication device 1 in FIG. 1, and may comprise the baseband circuit 10 and the RF circuit 12. The power control device for mobile communication may perform all the methods and embodiments described according to FIG. 1 to FIG. 4.

As used herein, the term "determining" encompasses calculating, computing, processing, deriving, investigating, looking up (e.g., looking up in a table, a database or another data structure), ascertaining, and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA), or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power control method performed by a mobile communication device comprising a controller, a radio frequency circuit and a baseband circuit, the method comprising:
    receiving, by the radio frequency circuit, a Media Access Control (MAC) layer data packet on a first signal;
    determining, by the controller, when a second signal is to come according to the MAC layer data packet;
    turning off, by the controller, the radio frequency circuit when the first signal is received and the second signal has not yet arrived; and
    while the radio frequency circuit is turned off, processing, by the baseband circuit, the received first signal;
    wherein the step of determining when a second signal is to come comprises determining when a second signal is to come by SleepStateCapsuleDone and LastPacket bits in the MAC layer data packet.

2. The power control method of claim 1, further comprising turning on, by the controller, the radio frequency circuit before the second signal is to come.

3. The power control method of claim 1, further comprising turning on, by the controller, the radio frequency circuit after the baseband circuit finishes processing the received first signal.

4. The power control method of claim 1, wherein the mobile communication device supports a 3rd generation mobile telecommunications standards, the baseband circuit comprises a searcher circuit;
    the searcher circuit is configured to search for multipath of the received first signal; and
    the power control method further comprises turning off, by the controller, the searcher circuit when the first signal is received and the second signal has not yet arrived.

5. The power control method of claim 1, wherein the baseband circuit comprises an automatic gain control circuit configuring an automatic gain control for the RF circuit, and an automatic frequency control circuit configuring an automatic frequency control, the power control method further comprising turning off, by the controller, the automatic gain control circuit and the automatic frequency control circuit when the first signal is received and the second signal has not yet arrived.

6. The power control method of claim 1, further comprising determining, by the controller, when the second signal is to come based on the first signal.

7. The power control method of claim 1, further comprising:
    determining, by the controller, the first signal is decodable;
    wherein the turning off step comprises tuning off the RF circuit when the first signal is decodable.

8. The power control method of claim 1, wherein the first signal is a synchronous control channel capsule conforming to EVDO standard.

9. The power control method of claim 1, wherein the MAC layer data packet is transmitted in a synchronous capsule.

10. A power control device for mobile communication, comprising:
    an radio frequency circuit, configured to receive a Media Access Control (MAC) layer data packet on a first signal;
    a controller, coupled to the radio frequency circuit, configured to determine when a second signal is to come according to the MAC layer data packet, and to turn off the radio frequency circuit when the first signal is received and the second signal has not yet arrived; and
    a baseband circuit, coupled to the RF circuit and the controller, while the radio frequency circuit is turned off, configured to processing the received first signal;
    wherein the controller is configured to determining when a second signal is to come by SleepStateCapsuleDone and LastPacket bits in the MAC layer data packet.

11. The power control device for mobile communication of claim 10, wherein the controller is configured to turn on the radio frequency circuit before the second signal is to come.

12. The power control device for mobile communication of claim 10, wherein the controller is configured to turn on the radio frequency circuit after the baseband circuit finishes processing the received first signal.

13. The power control device for mobile communication of claim 10, wherein the mobile communication power controlling device supports a 3rd generation mobile telecommunications standards, the baseband circuit comprises a searcher circuit;

the searcher circuit is configured to search for multipath of the received first signal; and the controller is configured to turn off the searcher circuit when the first signal is received and the second signal has not yet arrived.

14. The power control device for mobile communication of claim 10, wherein the baseband circuit comprises an automatic gain control circuit configuring an automatic gain control for the RF circuit, and an automatic frequency control circuit configuring an automatic frequency control, and the controller is configured to turn off the automatic gain control circuit and the automatic frequency control circuit when part of the first signal is received and the second signal has not yet arrived.

15. The power control device for mobile communication of claim 10, wherein the controller is configured to determine when the second signal is to come based on the first signal.

16. The power control device for mobile communication of claim 10, wherein the controller is configured to determine the first signal is decodable, and turn off the RF circuit when the first signal is decodable.

17. The power control device for mobile communication of claim 10, wherein the first signal is a synchronous control channel capsule conforming to EVDO standard.

18. The power control device for mobile communication of claim 10, wherein the MAC layer data packet is transmitted in a synchronous capsule.

* * * * *